United States Patent
Hoener et al.

(10) Patent No.: US 11,845,075 B2
(45) Date of Patent: Dec. 19, 2023

(54) ROTARY FEEDER WITH CLEANING NOZZLES

(71) Applicant: Chevron Phillips Chemical Company LP, The Woodlands, TX (US)

(72) Inventors: Andrea L. Hoener, Kingwood, TX (US); Elena Mathopoullos, Houston, TX (US); Jorge Garza, Baytown, TX (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 713 days.

(21) Appl. No.: 17/018,590

(22) Filed: Sep. 11, 2020

(65) Prior Publication Data
US 2020/0406210 A1    Dec. 31, 2020

Related U.S. Application Data

(63) Continuation of application No. 15/985,854, filed on May 22, 2018, now Pat. No. 10,864,494.
(Continued)

(51) Int. Cl.
| | |
|---|---|
| *B01J 8/00* | (2006.01) |
| *B01J 8/10* | (2006.01) |
| *B01J 4/00* | (2006.01) |
| *B01J 19/26* | (2006.01) |
| *C08F 2/01* | (2006.01) |
| *B01J 19/18* | (2006.01) |
| *B65B 37/08* | (2006.01) |

(Continued)

(52) U.S. Cl.
CPC ............ *B01J 8/0045* (2013.01); *B01J 4/002* (2013.01); *B01J 8/006* (2013.01); *B01J 8/0055* (2013.01); *B01J 8/10* (2013.01); *B01J 19/1818* (2013.01); *B01J 19/1837* (2013.01); *B01J 19/26* (2013.01); *B65B 37/08* (2013.01); *B65G 53/4641* (2013.01); *C08F 2/01* (2013.01); *B01J 2208/00752* (2013.01); *B01J 2208/00769* (2013.01); *B01J 2219/00162* (2013.01); *B65G 53/4633* (2013.01); *C08F 2/001* (2013.01)

(58) Field of Classification Search
CPC ........ B01J 8/0045; B01J 4/002; B01J 8/0055; B01J 8/006; B01J 8/10; B01J 19/1818; B01J 19/1837; B01J 19/26; B01J 2208/00752; B01J 2208/00769; B01J 2219/00162; B65B 37/08; B65G 53/4641; B65G 53/4633; C08F 2/01; C08F 2/001
See application file for complete search history.

(56) References Cited

U.S. PATENT DOCUMENTS

| | | |
|---|---|---|
| 580,174 A | 4/1897 | Higgins |
| 664,440 A | 12/1900 | Schulthess |

(Continued)

*Primary Examiner* — Donnell A Long
(74) *Attorney, Agent, or Firm* — Conley Rose, P.C.

(57) ABSTRACT

A rotary feeder having a stationary, cylindrical housing having disposed therein a number of injection nozzles, and within which rotate a plurality of vanes about a central axis, wherein pairs of adjacent vanes of the plurality of vanes define wedge volumes, wherein the housing extends a width along the central axis, wherein each of the vanes has a length along the central axis, and wherein the injection nozzles are positioned across the width of the housing, such that a spray pattern of a gas injected via the number of injection nozzles spans substantially the entire length of the vanes.

20 Claims, 6 Drawing Sheets

Related U.S. Application Data

(60) Provisional application No. 62/516,230, filed on Jun. 7, 2017.

(51) Int. Cl.
*B65G 53/46* (2006.01)
*C08F 2/00* (2006.01)

(56) References Cited

U.S. PATENT DOCUMENTS

| | | | |
|---|---|---|---|
| 941,024 A | 11/1909 | Mantius | |
| 1,669,962 A | 5/1928 | Wihlfahrt | |
| 2,428,241 A | 9/1947 | Pootjes | |
| 2,517,339 A * | 8/1950 | Offutt | B01J 8/10 208/126 |
| 2,708,604 A * | 5/1955 | Berg | B01J 8/0045 406/174 |
| 2,750,233 A * | 6/1956 | Yellott | F02C 3/26 406/67 |
| 3,151,784 A * | 10/1964 | Tailor | B65G 53/4633 406/65 |
| 3,248,179 A | 4/1966 | Norwood | |
| 3,367,544 A | 2/1968 | Formando | |
| 4,155,657 A | 5/1979 | King | |
| 4,322,384 A | 3/1982 | Sutton | |
| 4,443,551 A | 4/1984 | Lionetti | |
| 4,501,885 A | 2/1985 | Sherk | |
| 4,588,790 A | 5/1986 | Jenkins, III | |
| 5,044,837 A * | 9/1991 | Schmidt | B65G 53/4633 406/128 |
| 5,352,749 A | 10/1994 | Dechellis | |
| 5,436,304 A | 7/1995 | Griffin | |
| 5,455,314 A | 10/1995 | Burns | |
| 5,565,175 A | 10/1996 | Hottovy | |
| 5,575,979 A | 11/1996 | Hanson | |
| 5,896,875 A | 4/1999 | Yoneda | |
| 6,239,235 B1 | 5/2001 | Hottovy | |
| 6,262,191 B1 | 7/2001 | Hottovy | |
| 6,833,415 B2 | 12/2004 | Kendrick | |
| 7,109,289 B2 | 9/2006 | Echigo | |
| 7,109,290 B2 | 9/2006 | McElvain | |
| 7,619,047 B2 | 11/2009 | Yang | |
| 8,025,792 B2 | 9/2011 | Delesdernier | |
| 8,921,498 B2 | 12/2014 | Kufeld | |
| 2005/0214474 A1 | 9/2005 | Han | |
| 2006/0094590 A1 | 5/2006 | McDaniel | |
| 2007/0197374 A1 | 8/2007 | Yang | |
| 2010/0029872 A1 | 2/2010 | Jensen | |
| 2010/0041842 A1 | 2/2010 | Yang | |

* cited by examiner

ROTARY FEEDER WITH CLEANING NOZZLES

CROSS-REFERENCE TO RELATED APPLICATIONS

This application is a continuation of and claims priority to U.S. patent application Ser. No. 15/985,854 filed May 22, 2018, published as U.S. Patent Application Publication No. US 2018/0353923 A1, which is a non-provisional of and claims priority to U.S. Provisional Patent Application No. 62/516,230 filed Jun. 7, 2017 and both entitled "Rotary Feeder with Cleaning Nozzles," each of which application is incorporated by reference herein in its entirety.

STATEMENT REGARDING FEDERALLY SPONSORED RESEARCH OR DEVELOPMENT

Not applicable.

TECHNICAL FIELD

The present disclosure relates to a rotary feeder comprising cleaning nozzles; more specifically, this disclosure relates to transferring polymer within a polymerization system via a rotary feeder comprising cleaning nozzles; still more specifically, the present disclosure relates to utilizing a rotary feeder comprising cleaning nozzles to transfer polymer from an upstream unit to a downstream unit.

BACKGROUND

Rotary feeders can be utilized to transfer material from one unit or location to another within a process. For example, polymer products, or polymer fluff, within a polymerization system may be transferred from a polymerization reactor to a downstream step, such as extrusion of polymer into pellets, via utilization of one or more rotary feeders. Prior to extrusion, equipment and processes may be utilized to purge solvents or other fluids or contaminants that may be entrapped among the polymer solids. Rotary feeders may be employed at one or more locations to transfer polymer from upstream equipment to downstream equipment such as conveying systems involving hydraulics, pneumatics, pressurized air, or a combination thereof; high pressure and low pressure solvent flash and recovery systems; flow control systems; lock hoppers; purge vessels; degassers; disengaging vessels; and the like.

With existing designs, polymer fluff, which may be sticky, can build up on internals of transfer apparatus, such as on the vanes of rotary feeders. When a desired production rate cannot be maintained due to the buildup (e.g., when an increase in rotation speed of a rotary feeder cannot provide adequate polymer fluff transfer due to decreased available fill volume as a result of polymer buildup on the vanes thereof), undesirable downtime may be needed for cleaning of the transfer apparatus. The cost of such downtime, and the equipment and power necessary to effect movement of the polymer between the polymerization reactor(s) and a downstream unit may be substantial. Accordingly, a need exists for more efficient polymer transfer apparatus, systems and methods.

BRIEF SUMMARY

Disclosed herein is a rotary feeder comprising: a stationary, cylindrical housing having disposed therein a number of injection nozzles, and within which rotate a plurality of vanes about a central axis, wherein pairs of adjacent vanes of the plurality of vanes define wedge volumes, wherein the housing extends a width along the central axis, wherein each of the vanes has a length along the central axis, and wherein the injection nozzles are positioned across the width of the housing, such that a spray pattern of a gas injected via the number of injection nozzles spans substantially the entire length of the vanes.

Further disclosed herein is a rotary feeder comprising: a stationary, cylindrical housing having disposed therein a number of injection nozzles, and within which rotate a plurality of vanes about a central axis, wherein the housing extends a width along the central axis, wherein each of the vanes has a length along the central axis, wherein the injection nozzles are positioned across the width of the housing, such that a spray pattern of a gas injected via the number of injection nozzles spans substantially the entire length of the vanes, and wherein each of the number of injection nozzles is located at a position along a circumference of the housing that is in the range of from about 50° to about 170° from an inlet of the rotary feeder, along a direction of rotation of the plurality of vanes.

Also disclosed herein is a rotary feeder comprising: a stationary, cylindrical housing having disposed therein a number of injection nozzles, and within which rotate a plurality of vanes about a central axis, wherein the housing extends a width along the central axis from end walls thereof, wherein each of the vanes extends a length along the central axis, wherein the length each of the plurality of vanes extends along the central axis is slightly less than the width of the housing along the central axis, such that the each of the plurality of vanes extends almost to the end walls of the housing and can rotate freely within the housing, and wherein the injection nozzles are positioned across the width of the housing, such that a spray pattern of a gas injected via the number of injection nozzles spans substantially the entire length of the vanes.

Further disclosed herein is a rotary feeder comprising: a stationary, cylindrical housing having disposed therein a number of injection nozzles, and within which rotate a plurality of vanes about a central axis, wherein the stationary, cylindrical housing defines an inlet and an outlet, wherein the inlet is positioned at a top of the housing, and the outlet is positioned at a bottom of the housing, wherein the housing extends a width along the central axis, wherein each of the vanes has a length along the central axis, and wherein the injection nozzles are positioned across the width of the housing, such that a spray pattern of a gas injected via the number of injection nozzles spans substantially the entire length of the vanes.

BRIEF DESCRIPTION OF THE DRAWINGS

The detailed description will reference the drawings briefly described below, wherein like reference numerals represent like parts, unless otherwise indicated. The inventive concepts disclosed and claimed herein may be better understood by reference to one or more of these figures in combination with the detailed description of specific embodiments presented herein.

Figure 1A:
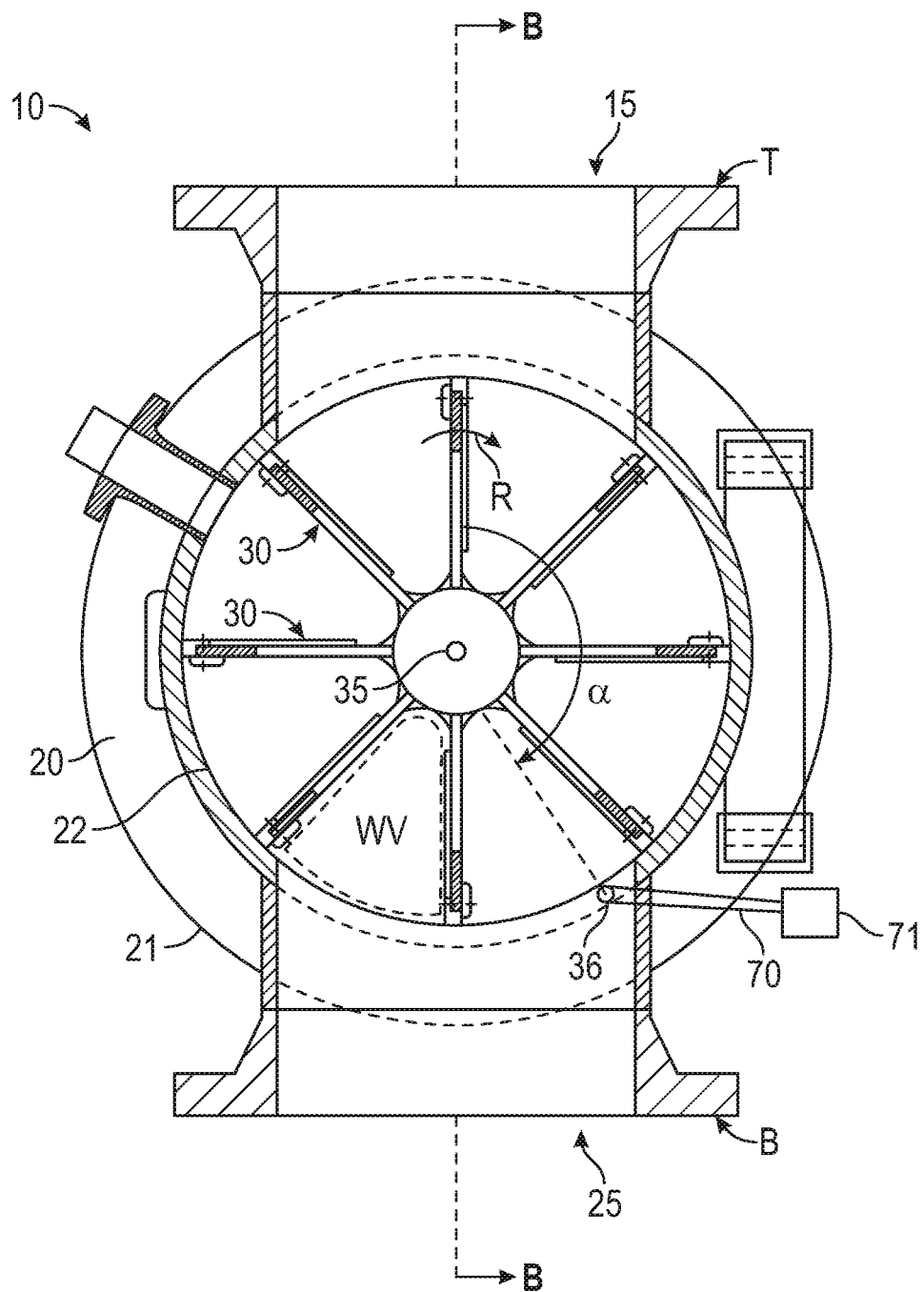
FIG. 1A illustrates a cross-section view of a rotary feeder according to an embodiment of this disclosure.

While the inventive concepts disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

Disclosed herein is a rotary feeder (also referred to herein as a 'rotary valve') comprising cleaning apparatus configured to spray vanes of the rotary feeder with a gas whereby buildup of material on the vanes may be reduced relative to a rotary feeder not comprising such cleaning apparatus. Such buildup undesirably takes up volume within a rotary feeder, reducing the amount of material that can be transported by the rotary feeder. In embodiments, the cleaning apparatus of the herein-disclosed rotary feeder may comprise tubing or other conduit for the introduction of gas into the rotary feeder; however, incorporation of injection nozzles, as described hereinbelow, which may provide a particular spray pattern, may more effectively clean the interior surfaces (e.g., the rotating vanes) of the rotary feeder, and the following description will be made with reference to such injection nozzles. A rotary feeder as described herein may be particularly suitable for use in transferring a sticky material, such as a polymer (also referred to herein as a polymer 'fluff' or 'flake') produced in a polymerization reactor, which may be located upstream of the herein-disclosed rotary feeder in polymer transfer systems comprising the rotary feeder.

Figure 1B:
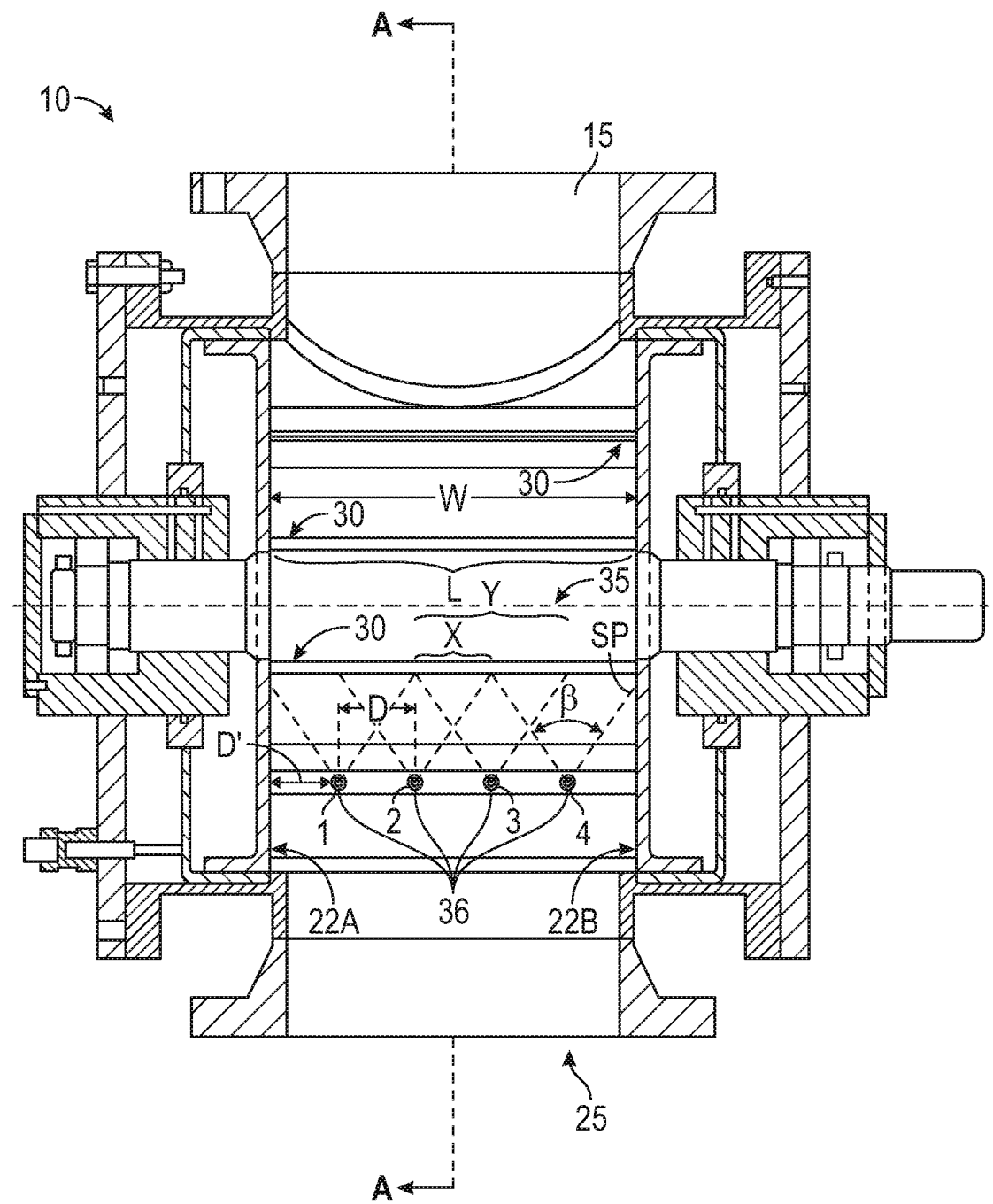
FIG. 1B illustrates a view of the rotary feeder of FIG. 1A taken along vertical axis B-B.

FIG. 1A illustrates a cross-section view of a rotary feeder 10 according to an embodiment of this disclosure. FIG. 1B illustrates a view of rotary feeder 10 of FIG. 1A taken along vertical axis B-B. These will be discussed in combination. Rotary feeder 10 comprises a stationary, cylindrical housing 20 having disposed therein a number of injection nozzles 36, and within which rotate a plurality of vanes 30 about a central axis 35. Housing 20 extends a width W along central axis 35, and each of the vanes 30 has a length L along the central axis 35. Injection nozzles 36 are positioned across the width W of housing 20, such that a spray pattern SP of a gas injected via the number of injection nozzles 36 spans substantially the entire length L of the vanes 30, whereby injected gas can spray the vanes 30, cleaning them as they rotate past the injection nozzles 36. Cylindrical housing 20 may have an outer diameter 21 and inner diameter 22.

A rotary feeder of any desired size can be configured with injection nozzles according to this disclosure. In embodiments, the length L of each vane 30 is in the range of from about 10 inches (25.4 cm) to about 50 inches (127 cm), from about 10 inches (25.4 cm) to about 30 inches (76.2 cm), or from about 12 inches (30.5 cm) to about 20 inches (50.8 cm). In embodiments, the length L of each vane 30 is approximately equal to 12, 13, 14, 15, 16, 17, 18, 19, or 20 inches (30.5, 33.0, 35.6, 38.1, 40.6, 43.2, 45.7, 48.3, or 50.8 cm). In embodiments, length L of each vane 30 is slightly less (e.g., less than 1, 0.5, 0.25, 0.15, 0.1 or 0.05 inch (25.4, 12.7, 6.35, 3.81, 2.54, or 1.27 mm)) than width W of housing 20 such that vanes 30 are positioned adjacent to the housing end wall and can rotate freely therewithin during operation of rotary feeder 10.

Stationary, cylindrical housing 20 may further define an inlet and an outlet. The inlet may be positioned proximate a top T of the housing, and the outlet may be positioned proximate a bottom B of the housing. For example, as indicated in the embodiment of FIGS. 1A and 1B, cylindrical housing 20 of rotary feeder 10 defines inlet 15 and outlet 25, with inlet 15 located at a top of rotary feeder 10, and outlet 25 located at a bottom thereof. In an embodiment, the inlet and outlet are located about 190°, 185°, 180°, 175° or 170° opposite of each other.

As illustrated in FIG. 1A, injection nozzles 36 can be positioned at any location along housing 20. In embodiments, the injection nozzles 36 are positioned such that wedge volumes WV defined by two adjacent vanes 30 of the rotary feeder are substantially full when they rotate past the location of injection nozzles 36 within housing 20. In embodiments, each of the number of injection nozzles 36 may be located at a position along a circumference of housing 20 that is an angle α in the range of from about 50° to about 170°, from about 70° to about 160°, or from about 90° to about 160° from a top or inlet 15 of rotary feeder 10, along direction of rotation R of the plurality of vanes 30. In embodiments, angle α is about equal to 150°, 155°, 160°, 165°, or 170°. Such positioning may be desirable such that the presence of sprayed gas within the wedge volumes WV does not limit the introduction of additional material (e.g., polymer flake) into rotary feeder 10 via inlet 15 thereof. However, in alternative embodiments, the injection nozzles 36 are positioned so that wedge volumes WV defined by the vanes 30 of rotary feeder 10 are substantially empty when they rotate past the injection nozzles. In such embodiments, each of the number of injection nozzles 36 may be located at a position along a circumference of housing 20 that is an angle α in the range of from about 200° to less than 360°, from about 200° to about 270°, or from about 200° to about 300° from a top or inlet 15 of rotary feeder 10, along direction of rotation R of the plurality of vanes 30. Although R is indicated as clockwise rotation in the embodiment of FIG. 1A, counterclockwise rotation is also envisioned, in embodiments. Vanes 30 may have a leading side facing the direction of rotation R, and a trailing side obverse, and the injection nozzles 36 may be oriented to spray gas onto the leading side, the trailing side, or both.

In embodiments, injection nozzles 36 are located substantially in a straight line (e.g., co-planer or sharing a common central axis) across the width W of housing 20. In embodiments, the injection nozzles 36 are located along a horizontal line such that each injection nozzle is approximately the same angle α from a top or inlet 15 of rotary feeder 10, and thereby share a common central axis passing through the housing wall along the width, W. In embodiments, the line of injection nozzles 36 is located at a position along the circumference of housing 20 that is an angle α in the range of from about 90 degrees to about 160 degrees from the inlet, along the direction of rotation R of the plurality of vanes 30. In embodiments, not shown in FIG. 1B, the injection nozzles span the width W of housing 20 along a line at an angle from axis of rotation 35, such that each nozzle is at a different angle α from inlet 15.

In embodiments, injection nozzles 36 are positioned substantially equidistantly apart across the width W of housing 20. A center-to-center distance D between adjacent injection nozzles 36 may be equal to the width W of housing 20 divided by the number of injection nozzles 36. In embodiments, the center-to-center distance D may be in the range of from about 1 inch (2.54 cm) to about 10 inches (25.4 cm), from about 2 inches (5.1 cm) to about 7 inches (17.8 cm), from about 2 inches (5.1 cm) to about 4 inches 10.2 cm), or equal to about 2, 3, 4, 5, 6, 7, 8, 9, or 10 inches (5.1, 7.6, 10.2, 12.7, 15.2, 17.8, 20.3, 22.9, or 25.4 cm).

In embodiments, a first injection nozzle and a last injection nozzle across the width W of the housing 20 are located a distance D' along the central axis 35, from an end of the housing closest thereto, that is about equal to half the center-to-center distance D between adjacent injection nozzles 36 (or, stated differently, distance D' is the width W of the housing divided by two times the number of injection nozzles). Thus, in embodiments, D' equals half of D. For example, in the embodiment of FIG. 1B, first injection nozzle 1 is located a distance D' along central axis 35 from first end 22A of housing 20 and last injection nozzle 4 is located a distance D' along central axis 35 from second end 22B of housing 20 that is about equal to the width W of the housing 20 divided by two times the number of injection nozzles.

The number of injection nozzles may be determined by dividing the width W of housing 20 by a desired spacing D between injection nozzles 36. In embodiments, the rotary feeder has disposed therein from 2 to 10, from 3 to 9, or from 4 to 5 injection nozzles. Rotary feeder 10 of FIG. 1B comprises injection nozzles 1, 2, 3, and 4.

Each of the number of injection nozzles 36 may be configured to provide a desired spray pattern. In embodiments, such desired spray pattern may be selected from fan patterns, air-knife patterns, or combinations thereof. For example, the spray pattern SP depicted in the embodiment of FIG. 1B is a fan spray pattern. Any suitable nozzle known in the art may be utilized. In embodiments, the injection nozzles are hydroblast nozzles. In embodiments, the nozzles are Standard Fan Nozzles available from BETE Fog Nozzle, Inc. in Greenfield, MA In embodiments, the nozzles are ¼ inch BETE standard fan nozzles, such as, for example, number NF70, having a 120° spray angle. In embodiments, the nozzles are nozzles as described in U.S. patent application Ser. No. 10/808,245, which is incorporated by reference herein in its entirety. Each of the injection nozzles 36 may be a one-piece construction. The injection nozzles 36 can be made of any suitable material. For example, in embodiments, injection nozzles 36 are constructed of brass, 303 stainless steel, 316 stainless steel, polyvinyl chloride (PVC), polytetrafluoroethylene (PTFE), or a combination thereof.

Injection nozzles 36 may provide a spray pattern SP with a spray angle β in the range of from about 15° to about 120°, from about 90° to about 120°, from about 100° to about 120°, from about 110° to about 120°, or equal to about 90°, 100°, 110°, or 120°. The injection nozzles 36 may be positioned across width W of housing 20 such that the spray pattern SP of each of the number of injection nozzles 36 overlaps the spray pattern of at least one adjacent nozzle 36. For example, the SP of an injection nozzle may extend a lengthy along vane 30 (i.e., at the distance of vane 30), and may overlap a distance x of the spray pattern provided by an adjacent nozzle. The spray pattern SP of each of the number of injection nozzles 36 may overlap the spray pattern of at least one adjacent nozzle by a percentage (x/y) in the range of from about 10% to about 50%, from about 10% to about 40%, or from about 10% to about 30%, or equal to at least 10%, 20%, or 30%.

Each of the spray nozzles 36 may be fluidly connected with a gas source 71 via one or more gas feed lines 70 (not shown to scale in FIG. 1A). In an embodiment, each of the spray nozzles 36 may be fluidly connected via a common gas distribution header in fluid communication with each nozzle and the gas source 71. Gas feed line 70 may have an inside diameter in the range of from about ¼ inch (6.35 mm) to about ⅜ inch (9.525 mm), from about 5/16 inch (7.9375 mm) to about ½ inch (12.7 mm), or from about ¼ inch (6.35 mm) to about ½ inch (12.7 mm), or equal to about ½ inch (12.7 mm), ¼ inch (6.35 mm), or ⅜ inch (9.525 mm). Gas source 71 may provide gas at a pressure in the range of from about 30 psi (0.21 MPa) to about 70 psi (0.48 MPa), from about 40 psi (0.28 MPa) to about 60 psi (0.41 MPa), or from about 50 psi (0.34 MPa) to about 60 psi (0.41 MPa), or equal to about 30 psi (0.21 MPa), 40 psi (0.28 MPa), 50 psi (0.34 MPa), 60 psi (0.41 MPa), or 70 psi (0.48 MPa).

Also disclosed herein is a system comprising a rotary feeder of this disclosure, for example a polymerization system comprising a polymer transport subsystem for transferring polymer from an upstream polymerization reactor to downstream equipment such as a pelletization extruder. Such a system can comprise a rotary feeder comprising injection nozzles as per this disclosure and configured to transfer a material (such as a polymer product) from equipment (e.g., a vessel) upstream of the rotary feeder, to equipment (e.g., a vessel) downstream of the rotary feeder that is configured to receive the material from the rotary feeder. Such a system can comprise one or more polymerization reactors configured to produce a product polymer, and a rotary feeder comprising injection nozzles as per this disclosure and configured to transfer the polymer product from equipment (e.g., a vessel) upstream of the rotary feeder that is configured to receive the polymer product produced in the one or more polymerization reactors, to equipment (e.g., a vessel) downstream of the rotary feeder that is configured to receive polymer product from the rotary feeder. Examples of equipment present in a polymer transport process include conveying systems involving hydraulics, pneumatics, pressurized air, or a combination thereof; high pressure and low pressure solvent flash and recovery systems; flow control systems; lock hoppers; purge vessels; degassers; disengaging vessels; storage or feed vessels, and the like. Although not shown in the Figures, the herein-disclosed system may additionally comprise any equipment associated with a polymerization process, such as pumps, control devices (e.g., a PID controller), measurement instruments (e.g., thermocouples, transducers, and flow meters), alternative inlet and outlet lines, etc., as known in the art.

Description of a system of this disclosure will now be made with reference to FIG. 2, which is a schematic illustration of a polymerization system 100 according to an embodiment of this disclosure. As noted above, a system of this disclosure can comprise an upstream vessel UV from which material is transferred to a rotary feeder 10' of this disclosure, and then to a downstream vessel DV to which the rotary feeder of this disclosure transfers the material, and may further comprise a vessel or reactor (which may be upstream of upstream vessel UV) configured to produce the material to be transferred via the rotary feeder. For example, as noted above, a system of this disclosure may comprise at least one polymerization reactor 40 operable to produce a product polymer. System 100 of the embodiment of FIG. 2 comprises polymerization reactor 40, upstream vessel UV, rotary feeder 10', and downstream vessel DV. Each of the components of system 100 will be described in further detail hereinbelow.

As used herein, the terms "polymerization reactor" or "reactor" may include at least one reactor in which polymerization of olefin monomers or comonomers to produce homopolymers or copolymers can be effected. Such homopolymers and copolymers may be referred to herein as polymers, polymer product, resins, polymer fluff, or polymer flake.

Polymerization reactor 40 is operable to produce a product polymer, or polymer 'fluff', from a feed introduced thereto via polymerization feed line(s) 41, and in the presence of a catalyst, which can be introduced via catalyst feeder 42 and catalyst feed line 43. Polymer fluff typically refers to virgin or untreated polymer produced in the reactor and prior to the addition of any additives (e.g., stabilizers) and/or undergoing any further processing (e.g., prior to pelletization). Polymerization reactor 40 may comprise any vessel or combination of vessels suitably configured to provide an environment for a chemical reaction (e.g., a contact zone) between monomers (e.g., ethylene) and/or polymers (e.g., an "active" or growing polymer chain), and optionally comonomers (e.g., butene-1, hexene) and/or copolymers, in the presence of a catalyst to yield a polymer (e.g., a polyethylene polymer) and/or copolymer. Although the embodiment illustrated in FIG. 2 shows a single polymerization reactor 40, one of skill in the art viewing this disclosure will recognize that any suitable number and/or configuration of polymerization reactors may be employed.

In various embodiments, polymerization reactor 40 may be a gas phase fluidized bed reactor, a loop slurry reactor, a stirred tank reactor, an axial flow reactor, a horizontal gas phase reactor, or a combination thereof. In embodiments, a system of this disclosure comprises at least one gas phase or slurry loop polymerization reactor. In embodiments, the system provided herein comprises more than one polymerization reactor. In embodiments, the polymerization system comprises more than one reactor in series. In embodiments, the more than one polymerization reactor in series is operated to pass polymer continuously from one polymerization reactor to another.

The polymerization processes performed in the reactor(s) (e.g., reactor 40) may include batch or continuous processes. Continuous processes may employ intermittent or continuous product discharge. Processes may also include partial or full direct recycle of unreacted monomer, unreacted comonomer, diluent, or a combination thereof. In embodiments, polymer is continuously withdrawn from polymerization reactor 40 via polymer product line 45. In embodiments, polymer is continuously withdrawn from a gas phase fluidized bed polymerization reactor 40. In embodiments, polymer is continuously withdrawn from a loop slurry polymerization reactor 40.

In embodiments comprising multiple reactors, production of polymerization product in multiple reactors may include several stages provided by at least two separate polymerization reactors interconnected by a transfer device making it possible to transfer the polymerization product resulting from a first polymerization reactor into a second polymerization reactor. The desired polymerization conditions in one polymerization reactor may be different from the polymerization conditions of the other polymerization reactor(s). Alternatively, polymerization in multiple reactors may include the manual transfer of polymerization product (e.g., in a polymerization product slurry, as a mixture, as solid polymer, or combinations thereof) from one polymerization reactor to subsequent polymerization reactor(s) for continued polymerization. Multiple reactor systems may comprise any combination including, without limitation, multiple loop reactors, a combination of loop and gas reactors, multiple high-pressure reactors, or a combination of high pressure with one or more of loop and gas reactors. The multiple polymerization reactors may be operated in series, in parallel, or combinations thereof.

Operating conditions for the polymerization in polymerization reactor 40 may vary depending on polymerization reactor type. For example, the polymerization reactor may be operated at pressures of from about 100 psig (0.69 MPa) to about 75,000 psig (517.11 MPa). In embodiments, the polymerization reactor may be a loop slurry reactor operated at pressures of from about 550 psig (3.79 MPa) to about 800 psig (5.52 MPa); alternatively, a gas phase reactor operated at pressures of from about 100 psig (0.69 MPa) to about 500 psig (3.45 MPa); alternatively, a horizontal gas phase reactor operated at pressures of from about 250 psig (1.72 MPa) to about 350 psig (2.41 MPa); alternatively, an axial flow reactor operated at pressures of from about 100 psig (0.69 MPa) to about 5000 psig (34.47 MPa; alternatively, an autoclave reactor operated at pressures of from about 15,000 psig (103.42 MPa) to about 32,500 psig (224.08 MPa); alternatively, a tubular reactor operated at pressures of from about 30,000 psig (206.84 MPa) to about 60,000 psig (413.69 MPa).

Monomer, diluent, catalyst, any comonomer, various additives, or a combination thereof, which may be fed to the polymerization reactor 40 (e.g., via one or more polymerization feed line(s) 41), may circulate through the reactor as polymerization occurs. Generally, continuous processes may comprise the continuous introduction of a monomer, an optional comonomer, a catalyst, a diluent, etc., into polymerization reactor 40, and the continuous removal (e.g., via polymer product line 45) of a polymer product (which may be, for example, a slurry or gaseous phase) comprising solid polymer (e.g., polyethylene).

In embodiments, the monomer comprises an α-olefin, such as, without limitation, ethylene (ethene) or propylene (propene). In embodiments, a comonomer comprises an unsaturated hydrocarbon having from 3 to 12 carbon atoms. For example, a comonomer may comprise propene, butene-1, hexene-1, octenes, or combinations thereof.

In embodiments having multiple polymerization reactors, various types of reactors that may additionally be included in system 100 may comprise loop slurry polymerization reactors. Such reactors may have a loop configuration, as known in the art. In embodiments, suitable diluents used in a slurry polymerization process may include, but are not limited to, the monomer, and optionally, the comonomer, being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. In embodiments, diluents may comprise unsaturated hydrocarbons having from 3 to 12 carbon atoms. Further examples of suitable diluents include, but are not limited to propene, butene-1, hexene-1, octenes, or combinations thereof. Some loop polymerization reactions can occur under bulk conditions where no diluent is used. An example is polymerization of propylene monomer as disclosed in U.S. Pat. No. 5,455,314, which is hereby incorporated by reference herein in its entirety for all purposes not contrary to this disclosure.

A typical loop polymerization process is disclosed, for example, in U.S. Pat. Nos. 3,248,179, 4,501,885, 5,565,175, 5,575,979, 6,239,235, 6,262,191, 6,833,415, and 8,921,498, the disclosure of each of which is incorporated herein by reference in its entirety for all purposes not contrary to this disclosure.

In embodiments having multiple polymerization reactors, various types of reactors that may additionally be included in system 100 may comprise gas-phase reactors. Gas-phase reactors may comprise fluidized bed reactors or staged horizontal reactors. Gas-phase reactors may employ a continuous recycle stream containing one or more monomers continuously cycled through a fluidized bed in the presence of the catalyst under polymerization conditions. A recycle stream may be withdrawn from the fluidized bed and recycled back into the polymerization reactor. Simultaneously, polymer product may be withdrawn from the polymerization reactor and new or fresh monomer may be added to replace the polymerized monomer. Likewise, copolymer product may optionally be withdrawn from the reactor and new or fresh comonomer may be added to replace polymerized comonomer, polymerized monomer, or combinations thereof. Such gas phase polymerization reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Such gas phase reactor may be as disclosed in U.S. Pat. Nos. 5,352,749, 4,588,790 or 5,436,304, each of which is hereby incorporated herein by reference in its entirety for all purposes not contrary to this disclosure.

In embodiments having multiple polymerization reactors, various types of reactors that may additionally be included in system 100 may comprise high-pressure reactors. High-pressure reactors may comprise autoclave or tubular reactors. Tubular reactors may have several zones where fresh monomer (optionally, comonomer), initiators, or catalysts may be added. Monomer (optionally, comonomer) may be entrained in an inert gaseous stream and introduced at one zone of the polymerization reactor. Initiators, catalysts, catalyst components, or a combination thereof may be entrained in a gaseous stream and introduced at another zone of the reactor. The gas streams may be intermixed for polymerization. Heat and pressure may be employed appropriately to obtain optimal polymerization reaction conditions.

In embodiments having multiple reactors, various types of reactors that may additionally be included in system 100 may comprise a solution polymerization reactor wherein the monomer (optionally, comonomer) may be contacted with the catalyst composition by suitable stirring or other means. A carrier comprising an inert organic diluent or excess monomer (optionally, comonomer) may be employed. If desired, the monomer, optional comonomer, or both may be brought in the vapor phase into contact with the catalytic reaction product, in the presence or absence of liquid material. The polymerization zone may be maintained at temperatures and pressures that will result in the formation of a solution of the polymer in a reaction medium. Agitation may be employed to obtain better temperature control and to maintain uniform polymerization mixtures throughout the polymerization zone. Adequate means can be utilized for dissipating the exothermic heat of polymerization.

Conditions of a polymerization reactor, e.g., polymerization reactor 40, which may be chosen and even controlled for polymerization efficiency and to provide resin properties include temperature, pressure and the concentrations of various reactants. Polymerization temperature can affect catalyst productivity, polymer molecular weight and molecular weight distribution. Suitable polymerization temperature may be any temperature below the de-polymerization temperature according to the Gibbs free energy equation. Typically, this includes from about 60° C. (140° F.) to about 280° C. (536° F.), for example, or from about 70° C. (158° F.) to about 110° C. (230° F.), depending upon the type of polymerization reactor.

As noted hereinabove, suitable pressures will also vary according to the reactor and polymerization type. The pressure for liquid phase polymerizations in a loop reactor such as loop slurry polymerization reactor is typically less than 1,000 psig (6.9 MPa), for example, about 650 psig (4.5 MPa). Pressure for gas phase polymerization is usually from about 200 psig (1.4 MPa) to about 500 psig (3.4 MPa). High-pressure polymerization in tubular or autoclave reactors is generally run at about 20,000 psig (137.9 MPa) to 60,000 psig (413.7 MPa). Polymerization reactors can also be operated in a supercritical region occurring at generally higher temperatures and pressures. Operation above the critical point of a pressure/temperature diagram (supercritical phase) may offer advantages. In an embodiment, polymerization may occur in an environment having a suitable combination of temperature and pressure. For example, polymerization may occur at a pressure in a range of about 400 psi (2.8 MPa) to about 1,000 psi (6.9 MPa); alternatively, about 550 psi (3.8 MPa) to about 650 psi (4.5 MPa), alternatively, about 600 psi (4.1 MPa) to about 625 psi (4.3 MPa); and a temperature in a range of about 66° C. (150° F.) to about 110° C. (230° F.), alternatively, from about 91° C. (195° F.) to about 104° C. (220° F.).

The concentration of various reactants can be controlled to produce solid polymer with certain physical and mechanical properties. The proposed end-use product that will be formed by the solid polymer and the method of forming that product determines the desired properties. Mechanical properties include tensile, flexural, impact, creep, stress relaxation and hardness tests. Physical properties include density, molecular weight, molecular weight distribution, melting temperature, glass transition temperature, temperature melt of crystallization, density, stereoregularity, crack growth, long chain branching and rheological measurements.

The concentrations, partial pressures, or both of the monomer, comonomer, hydrogen, co-catalyst, modifiers, and electron donors are important in producing these resin properties. Comonomer may be used to control product density. Hydrogen may be used to control product molecular weight. Co-catalysts can be used to alkylate, scavenge poisons and control molecular weight. Activator-support can be used to activate and support the catalyst. Modifiers can be used to control product properties and electron donors affect stereoregularity, the molecular weight distribution, or molecular weight. In addition, the concentration of poisons may be minimized because poisons impact the reactions and product properties.

Thus, polymerization reaction components of the polymerization reactor(s) disclosed herein (e.g., polymerization reactor 40) may include olefin monomers (e.g., ethylene) and comonomers (e.g., hexene), diluent (e.g., isobutane, hexane, propane, or combinations thereof), molecular weight control agents (e.g., hydrogen), and any other desired co-reactants or additives. Polymerization reaction components may additionally include a catalyst, and optionally, a co-catalyst. Suitable catalyst for polymerizing the monomers and any comonomers may include, but is not limited to a catalyst(s) and, optionally, a co-catalyst(s), a promoter(s), or a combination thereof. Non-limiting examples of suitable catalyst systems include Ziegler Natta catalysts, Ziegler catalysts, chromium catalysts, chromium oxide catalysts, chromocene catalysts, metallocene catalysts, nickel catalysts, and combinations thereof. Non-limiting examples of co-catalyst include triethylboron, methyl aluminoxane, alkyls such as triethylaluminum, and combinations thereof. Suitable activator-supports may comprise solid super acid compounds. Without limitation, catalyst systems suitable for use in the polymerization reactor(s) of this disclosure have been described, for example, in U.S. Pat. No. 7,619,047 and U.S. Patent Application Publications No. 2007/0197374, 2009/0004417, 2010/0029872, 2006/0094590, and 2010/0041842, the disclosure of each of which is hereby incorporated herein by reference in its entirety for all purposes not contrary to this disclosure.

In an embodiment, the polymerization reactor product in line 45 (45A in the embodiments of FIGS. 3 and 5, which are described further hereinbelow) comprises polyolefins, which may be homopolymers or copolymers. In embodiments, the polymerization reactor product comprises polyethylene, polypropylene, polybutadiene, polybutene, polymethylpentene, or a combination thereof. In embodiments, the reactor product comprises copolymers of ethylene with propylene, butene, hexene, octene, or a combination thereof. The weight percent solids of the polymer product may vary. In an embodiment, the polymerization reactor is a liquid phase reactor (e.g., a loop slurry reactor) and comprises from about 0 to about 66 weight percent polyethylene solids.

In embodiments, the polymerization product comprises solid polymer and a liquid phase of a diluent. In an embodiment, the polymerization product comprises unreacted monomer, unreacted comonomer, or both in a liquid phase. In additional or alternative embodiments, the polymerization product may generally comprise various solids, semi-solids, volatile and nonvolatile liquids, or combinations thereof. In an embodiment, the polymerization product comprises one or more of hydrogen, nitrogen, methane, ethylene, ethane, propylene, propane, butane, isobutane, pentane, hexane, hexene-1 and heavier hydrocarbons. In an embodiment, ethylene may be present in a range of from about 0.1% to about 15%, alternatively, from about 1.5% to about 5%, alternatively, about 2% to about 4% by total weight of the liquid in polymerization product line 45/45A. Ethane may be present in a range of from about 0.001% to about 4%, alternatively, from about 0.2% to about 0.5% by total weight of the material in the polymerization product line 45/45A. Isobutane may be present in a range from about 80% to about 98%, alternatively, from about 92% to about 96%, alternatively, about 95% by total weight of the material in the polymerization product line 45/45A.

In embodiments, the polymerization product comprises a mixture of the solid polymer and a vapor phase of at least a portion of the diluent. In additional or alternative embodiments, the mixture may comprise unreacted, gaseous monomers or optional comonomers (e.g., unreacted ethylene monomers, unreacted butene-1 monomers), gaseous waste products, gaseous contaminants, or combinations thereof. As used herein, an "unreacted monomer," for example, ethylene, refers to a monomer that was introduced into a polymerization reactor during a polymerization reaction but was not incorporated into a polymer. As used herein, an "unreacted comonomer," for example, butene-1, refers to a comonomer that was introduced into a polymerization reactor during a polymerization reaction but was not incorporated into a polymer. Such gaseous phase product mixtures may be present when gas phase polymerization reactor(s) are utilized in rather than or in addition to a loop slurry reactor(s).

In embodiments, the solid polymer may comprise a homopolymer, a copolymer, or combinations thereof. The homopolymer, the polymers of the copolymer, or both may comprise a multimodal (e.g., a bimodal) polymer (e.g., polyethylene). For example, the solid polymer may comprise both a relatively high molecular weight, low density (HMWLD) polyethylene polymer component and a relatively low molecular weight, high density (LMWHD) polyethylene polymer component. Various types of suitable polymers may be characterized as having a various densities. For example, a Type I may be characterized as having a density in a range of from about 0.910 g/cm$^3$ to about 0.925 g/cm$^3$, alternatively, a Type II may be characterized as having a density from about 0.926 g/cm$^3$ to about 0.940 g/cm$^3$, alternatively, a Type III may be characterized as having a density from about 0.941 g/cm$^3$ to about 0.959 g/cm$^3$, alternatively, a Type IV may be characterized as having a density of greater than about 0.960 g/cm$^3$. The solid polymer may comprise other polyolefin polymers. In embodiments, the polymer product produced in polymerization reactor(s) 40 is a low density polymer, a Type I polymer, a Type II polymer, a Type III polymer, a Type IV polymer, or a combination thereof.

Figure 2:
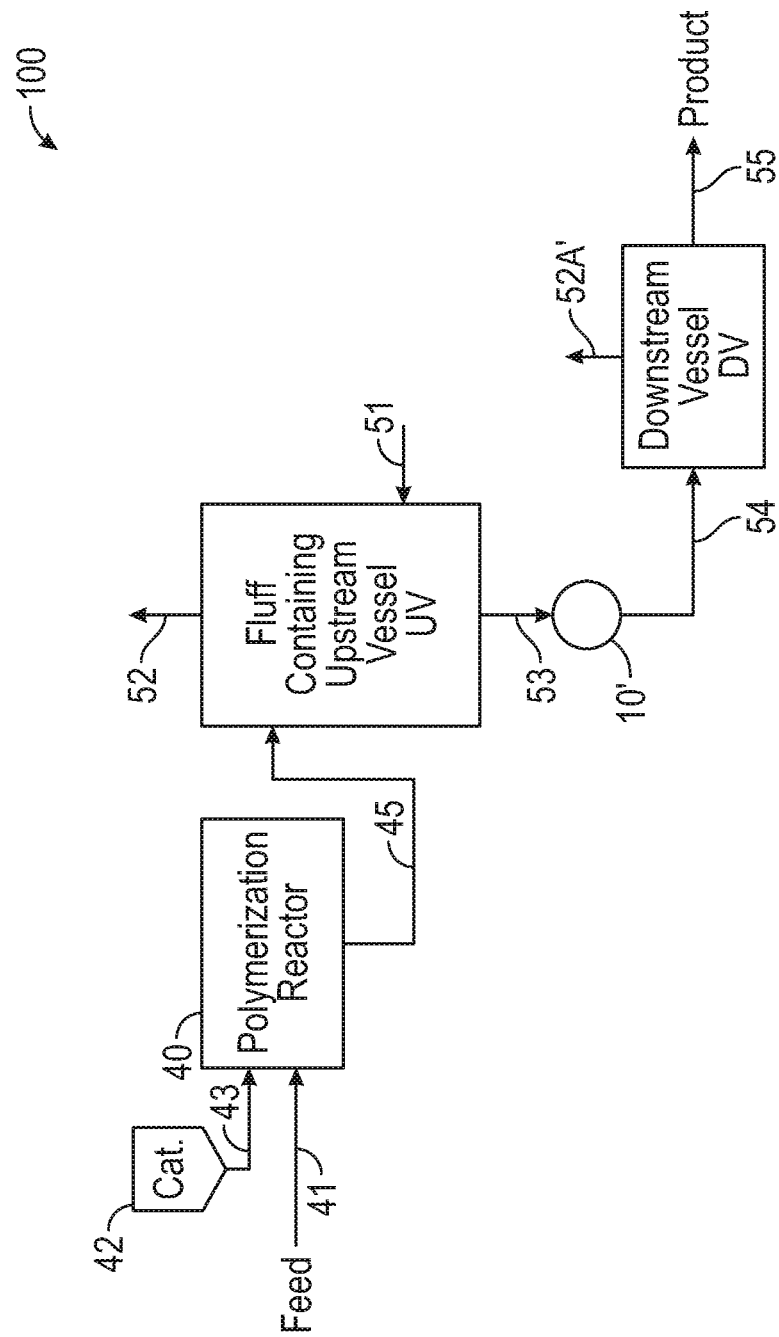
FIG. 2 illustrates a schematic of a polymerization system 100 according to an embodiment of this disclosure.

With continued reference to FIG. 2, a rotary feeder 10' is operable to transfer material, such as, without limitation, polymerization product comprising polymer fluff, from a vessel upstream of the rotary feeder. Rotary feeder 10' may be a rotary feeder comprising cleaning nozzles as described herein above with reference to FIG. 1. Although indicated in the embodiment of FIG. 2 as being in direct connection with polymerization reactor 40, via polymer product line 45, the upstream vessel or 'UV' can be any vessel downstream of polymerization reactor 40 into which polymer fluff is introduced, and from which said polymer fluff can be transferred via rotary feeder 10'. Rotary feeder 10' is fluidly connected with upstream vessel UV via upstream vessel outlet line 53, and, via rotary feeder outlet line 54, with a downstream vessel DV to which the polymer fluff is to be transferred. In embodiments, the upstream vessel UV may be positioned directly above the herein-disclosed rotary feeder comprising cleaning nozzles. In such embodiments, gravity may serve to feed material to the rotary feeder.

Figure 3:
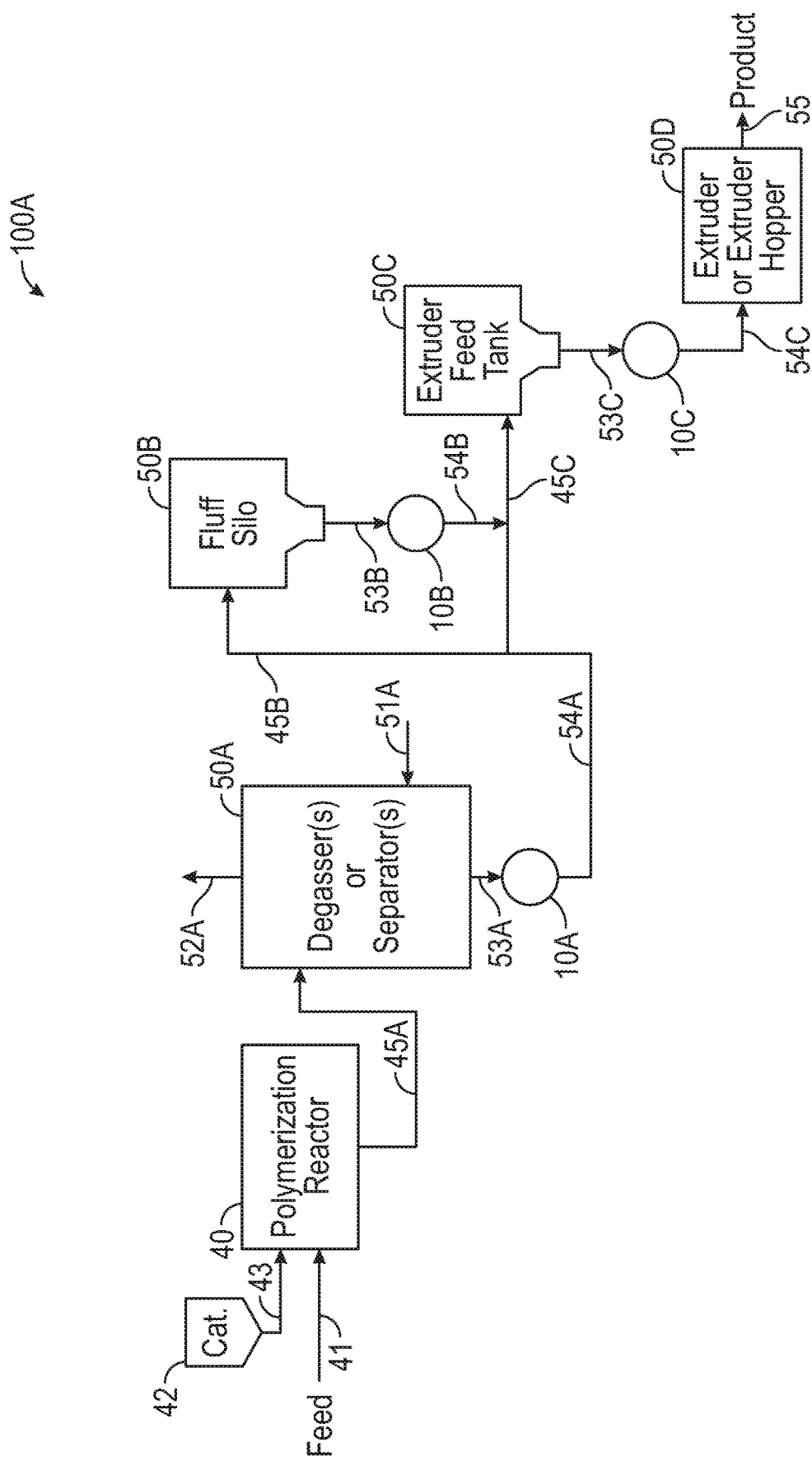
FIG. 3 illustrates a schematic of a polymerization system 100A according to another embodiment of this disclosure.
Figure 4:
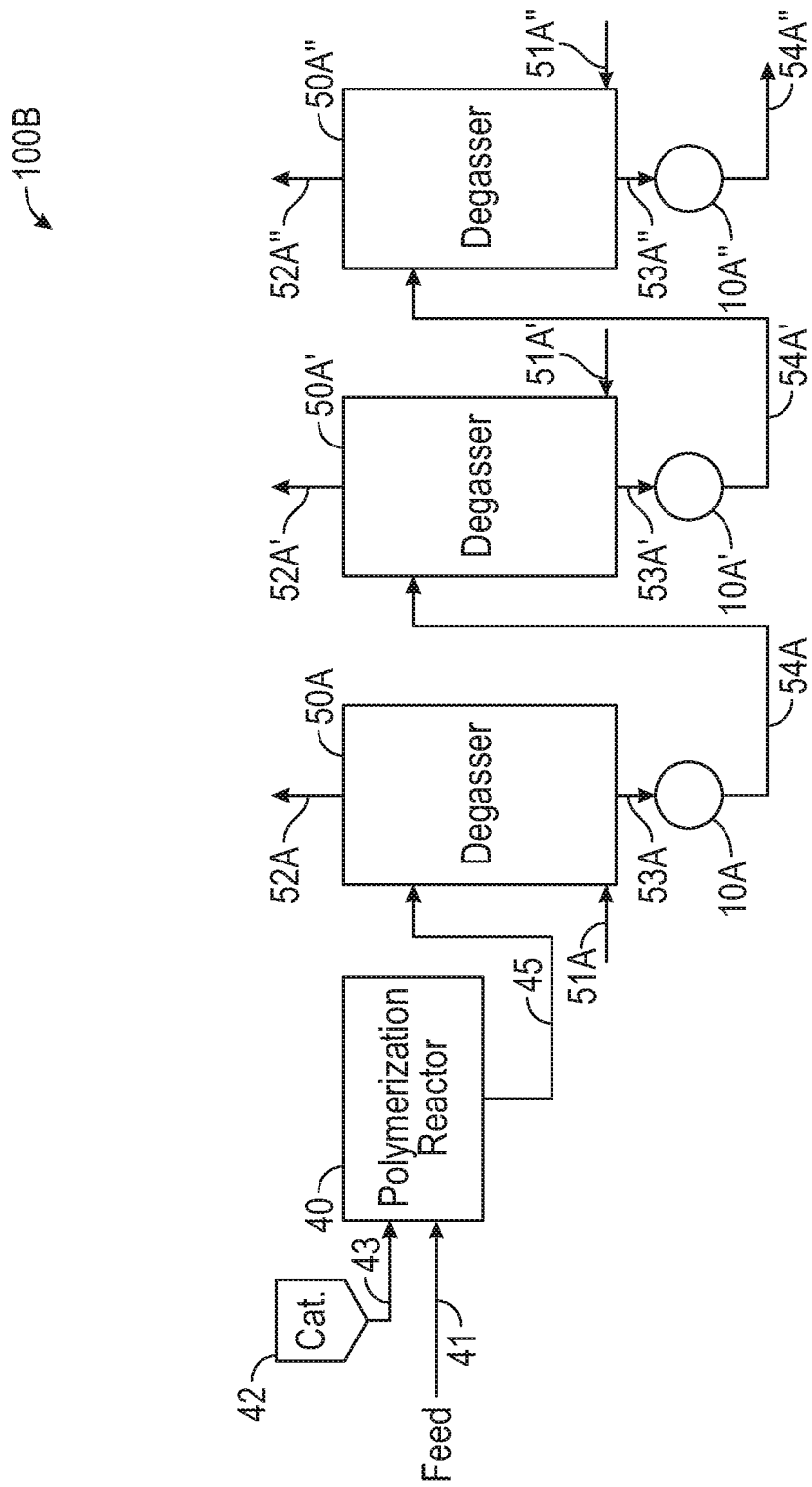
FIG. 4 illustrates a schematic of a polymerization system 100B according to another embodiment of this disclosure.
Figure 5:
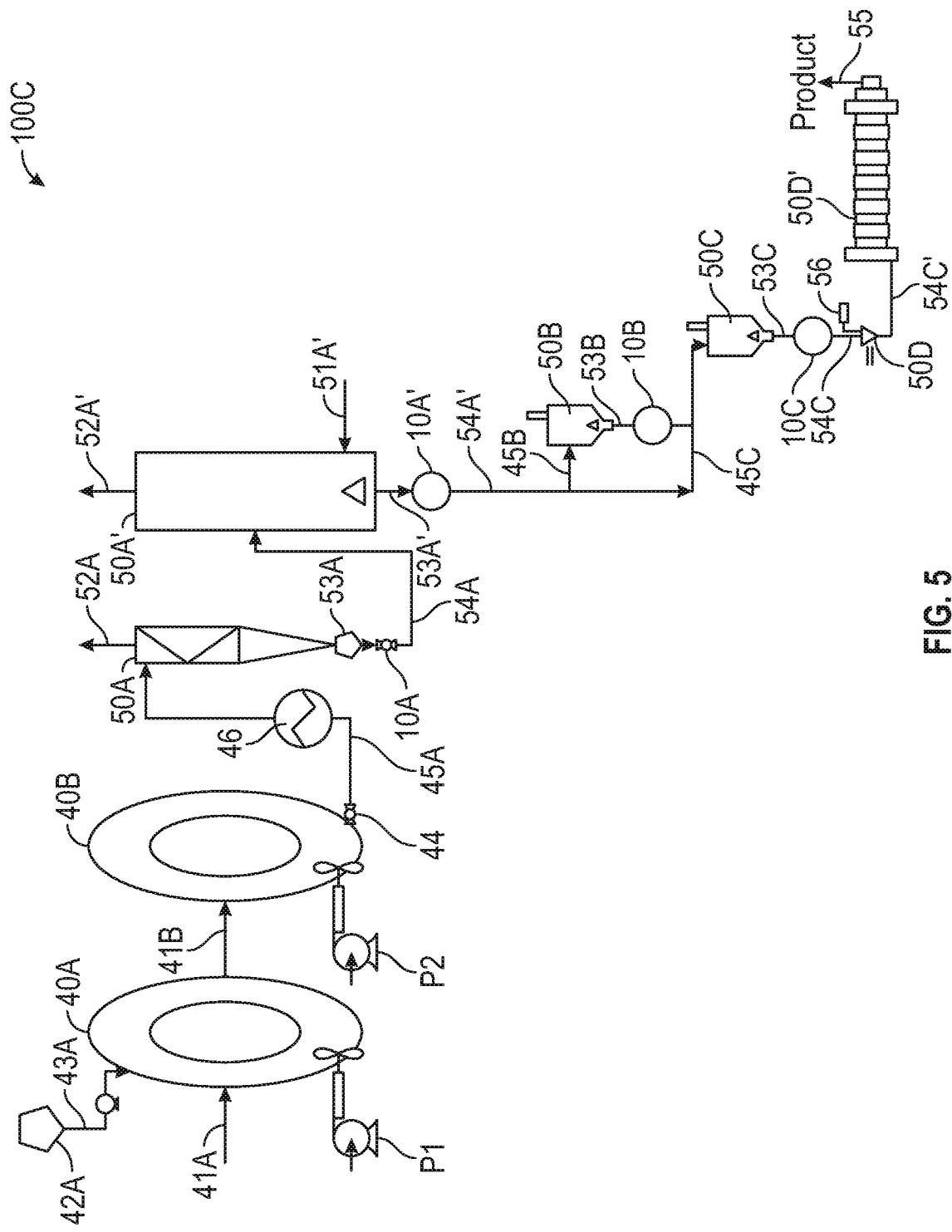
FIG. 5 illustrates a schematic of a polymerization system 100C according to another embodiment of this disclosure.

As will be described in more detail with reference to FIGS. 3-5, the fluff-containing upstream vessel UV from which polymer fluff will be transferred via rotary feeder 10' can comprise a flash unit, a purge column, a polymer product storage silo, a degasser (e.g., a primary degasser, a secondary degasser, a tertiary degasser), an extruder feed tank or vessel, or a combination thereof.

In embodiments, the upstream vessel UV is configured to remove residual hydrocarbon from a product polymer fluff or flake. For example, the upstream vessel UV may, in embodiments, be a degasser, a flash unit, or a purge column that is located downstream of the polymerization reactor(s) 40 and is configured to remove volatiles (e.g., diluent) from the polymer product. In such embodiments, a line 51 may be configured to introduce a gas (e.g., a purge gas) into upstream vessel UV, a line 52 may be configured for the removal of an off-gas (and associated volatiles) from upstream vessel UV, or both.

Any suitable technique may be used to separate the polymerization product into solid polymer and gases. For example, the upstream vessel UV or a separation vessel 50A (described hereinbelow with reference to the embodiment of FIG. 5) may comprise a vapor-liquid separator. Suitable embodiments of a vapor-liquid separator may include a distillation column, a flash tank, a filter, a membrane, a reactor, an absorbent, an adsorbent, a molecular sieve, a cyclone, or a combination thereof. In an embodiment, the upstream vessel comprises a flash tank. Not seeking to be bound by theory, such a flash tank may comprise a vessel configured to vaporize and/or remove low vapor pressure components from a fluid that is high temperature, high pressure, or both.

In embodiments, as described in further detail hereinbelow with reference to the embodiment of FIG. 4, polymerization reactor 40 comprises one or more gas phase polymerization reactors, and upstream vessel UV comprises a degasser, for example, a primary, secondary, or tertiary degasser. In other embodiments, as described in further detail hereinbelow with reference to the embodiment of FIG. 5, polymerization reactor 40 comprises one or more slurry loop polymerization reactors, and the upstream vessel UV comprises a flash unit or a purge column.

In embodiments, upstream vessel UV is configured for the storage of product polymer fluff. For example, in embodiments, as described in more detail with reference to the embodiments of FIGS. 3 and 5, upstream vessel UV may comprise a fluff silo or storage tank, an extruder feed tank, or the like.

As indicated in the embodiment of FIG. 2, rotary feeder 10' is positioned flow-wise between upstream vessel UV and downstream vessel DV, and is operable to transfer material therebetween. In embodiments, the downstream vessel DV may be positioned directly below the herein-disclosed rotary feeder comprising cleaning nozzles. The downstream vessel can be any vessel into which the material in upstream vessel UV, from which the material to be transferred is introduced into rotary feeder 10', is to be transferred. By way of non-limiting example, the downstream vessel DV can be a fluff silo or storage tank, a feed tank (e.g., an extruder feed tank or extruder hopper), a purge tank, a degasser, or the like. In embodiments, a rotary feeder of this disclosure is utilized to transfer product polymer fluff from an upstream vessel comprising a flash unit to a downstream vessel comprising a purge column; in embodiments, a rotary feeder of this disclosure is utilized to transfer product polymer fluff from an upstream vessel comprising a purge column to a downstream vessel comprising a fluff silo, an extruder feed tank, an extruder hopper, or an extruder; in embodiments, a rotary feeder of this disclosure is utilized to transfer product polymer fluff from an upstream vessel comprising a degasser (e.g., a primary or secondary degasser) to a downstream vessel comprising another degasser (e.g., a secondary or tertiary degasser); in embodiments, a rotary feeder of this disclosure is utilized to transfer product polymer fluff from an upstream vessel comprising a degasser to a downstream vessel comprising a fluff silo, an extruder feed tank, an extruder hopper, or an extruder. The 'cleaning' gas injected via injection nozzles 36 may be transferred along with the transferred material into the downstream vessel. In embodiments, the downstream vessel DV may comprise a gas outlet (such as 52A'/52A") via which cleaning gas transferred thereto along with the transferred material from the rotary feeder may be removed from the system. Product (e.g., polymer pellets) may be removed from the system via product outlet line 55.

Another system of this disclosure will now be described with reference to FIG. 3. System 100A of FIG. 3 comprises polymerization reactor 40, degasser(s) or separator(s) 50A, fluff silo 50B, extruder feed tank 50C, and an extruder or extruder hopper 50D. Polymerization reactor(s) 40 are as described hereinabove with reference to the embodiment of FIG. 2. Degasser(s) 50A are configured for the removal of hydrocarbons from the polymer product, and may be any degasser(s) known in the art. In embodiments, a gas inlet line 51A is operable to introduce a stripping gas, such as, without limitation, fresh nitrogen, recycled nitrogen, or a combination thereof into degasser(s) 50A. In embodiments, a gas outlet line 52A is fluidly connected with degasser(s) 50A, and configured for the removal of stripped hydrocarbons and stripping gas from degasser(s) 50A. Fluff silo or storage tank 50B may be any storage vessel operable for the storage of polymer fluff or flake. Extruder feed tank 50C may be any vessel operable for the storage of polymer fluff for introduction into a downstream extruder. In embodiments, various components (e.g., one or more additives) may be combined with the polymer fluff in extruder feed tank 50C, and subsequently extruded therewith. Unit 50D may be an extruder as known in the art to be operable to extrude polymer pellets from a feed comprising the polymer fluff and optionally various additives. In embodiments, unit 50D is an extruder hopper, as known in the art. One or more lines may be fluidly connected with unit 50D, and configured for the introduction of various components (e.g., additives) into extruder or extruder hopper 50D, whereby said components can subsequently be extruded with the polymer fluff. Such additives are known to those of skill in the art, and will not be expounded upon here.

A rotary feeder 10A according to this disclosure may be positioned between an upstream degasser 50A, with which it is fluidly connected via degasser outlet line 53A, and a downstream vessel comprising a fluff silo 50B. Rotary feeder 10A may be configured to transfer polymer fluff produced in polymerization reactor 40, transferred to degasser(s) 50A via polymerization reactor outlet line 45A, and degassed in degasser 50A to downstream fluff silo 50B via rotary feeder outlet line 54A and fluff silo feed line 45B. Alternatively or additionally, rotary feeder 10A may be configured to transfer polymer fluff produced in polymerization reactor 40 and degassed in degasser 50A to an extruder feed tank 50C via rotary feeder outlet line 54A and extruder feed tank inlet line 45C. Alternatively, or additionally, a rotary feeder 10B according to this disclosure may be positioned between fluff silo or storage tank 50B, with which it is fluidly connected via fluff silo outlet line 53B, and a downstream vessel comprising an extruder feed tank 50C, with which it is connected via rotary feeder outlet line 54B and extruder feed tank inlet line 45C. In this manner, rotary feeder 10B may be configured to transfer polymer fluff stored in fluff silo 50B to a downstream extruder feed tank 50C (or, not shown in FIG. 3, to a downstream extruder hopper or extruder 50D). Alternatively or additionally, a rotary feeder 10C according to this disclosure may be positioned between an upstream vessel comprising extruder feed tank 50C, with which it is fluidly connected via extruder feed tank outlet line 53C, and a downstream vessel comprising an extruder hopper or extruder 50D, with which it is connected via rotary feeder outlet line 54C. In this manner, rotary feeder 10C may be configured to transfer polymer fluff stored in extruder feed tank 50C to a downstream extruder hopper or extruder 50D. Extruded product comprising pelletized polymer may be removed from system 100A via product outlet line 55.

As noted hereinabove, a system according to this disclosure may comprise one or more degassers. A system of this disclosure comprising multiple degassers will now be described with reference to FIG. 4. System 100B of the embodiment of FIG. 4 comprises polymerization reactor 40, primary degasser 50A, secondary degasser 50A', and tertiary degasser 50A". Polymerization reactor(s) 40 are as described hereinabove with reference to the embodiment of FIG. 2. As with degasser(s) 50A described hereinabove with reference to the embodiment of FIG. 3, primary, secondary, and tertiary degassers 50A, 50A', and 50A" are configured for the removal of hydrocarbons from the polymer product, and may be any degasser(s) known in the art. In embodiments, a gas inlet line 51A, 51A', 51A" is operable to introduce a stripping gas, such as, without limitation, fresh nitrogen, recycled nitrogen, or a combination thereof into degasser 50A, 50A', 50A", respectively. In embodiments, a gas outlet line 52A, 52A', 52A" is fluidly connected with degasser 50A, 50A', 50A", respectively, and is configured for the removal of stripped hydrocarbons and stripping gas therefrom.

A rotary feeder 10A may be positioned downstream of primary degasser 50A, and fluidly connected therewith via primary degasser outlet line 53A, whereby primarily degassed polymer fluff can be introduced thereto. Rotary feeder 10A may be configured for the transfer of primarily degassed polymer fluff from primary degasser 50A into a downstream vessel, such as secondary degasser 50A', via line 54A. Alternatively or additionally, a rotary feeder 10A' may be positioned downstream of secondary degasser 50A', and fluidly connected therewith via secondary degasser outlet line 53A', whereby secondarily degassed polymer fluff can be introduced thereto. Rotary feeder 10A' may be configured for the transfer of secondarily degassed polymer fluff from secondary degasser 50A' into a downstream vessel, such as tertiary degasser 50A", via line 54A'. Alternatively or additionally, a rotary feeder 10A" may be positioned downstream of tertiary degasser 50A", and fluidly connected therewith via tertiary degasser outlet line 53A", whereby tertiarily degassed polymer fluff can be introduced thereto. Rotary feeder 10A" may be configured for the transfer, via line 54A", of tertiarily degassed polymer fluff from tertiary degasser 50A" into a downstream vessel, such as, for example, a fluff silo or storage tank, an extruder feed tank, an extruder hopper, or an extruder, as described hereinabove with reference to the embodiment of FIG. 3.

As noted hereinabove, a system of this disclosure may comprise multiple polymerization reactors, a flash unit, a purge column, or a combination thereof, in addition to a rotary feeder according to this disclosure. Such a system will now be described with reference to FIG. 5. System 100C of FIG. 5 comprises first polymerization reactor 40A, second polymerization reactor 40B, flash unit 50A, purge column 50A', fluff silo or storage tank 50B, extruder feed tank 50C, extruder hopper 50D, and extruder 50D'.

Polymerization reactors 40A and 40B can be any suitable polymerization reactors, as described hereinabove with reference to the embodiment of FIG. 2. In embodiments, polymerization reactors 40A and 40B are selected from gas phase polymerization reactors and loop slurry polymerization reactors. In embodiments, first polymerization reactor 40A and second polymerization reactor 40B are loop slurry reactors. Catalyst line 43A may be operable to introduce polymerization catalyst, as described hereinabove with reference to the embodiment of FIG. 2, from catalyst storage unit 42A into first polymerization reactor 40A. One or more feed lines 41A may be configured for the introduction of a polymerization feed as described hereinabove with reference to the embodiment of FIG. 2 into first polymerization reactor 40A. In embodiments, a pump P1 may be configured to circulate the contents of first polymerization reactor 40A (e.g., a slurry loop polymerization reactor). Line 41B may fluidly connect first polymerization reactor 40A and second polymerization reactor 40B, whereby a polymer product of first polymerization reactor 40A can be introduced into second polymerization reactor 40B. In embodiments, another line(s) 41B may be configured for the introduction of additional feed components into second polymerization reactor 40B. In embodiments, a catalyst feed line, similar to catalyst feed line 43A, and a catalyst storage unit similar to catalyst storage unit 42A may be configured for the introduction of catalyst (which may be the same or different from that introduced into first polymerization reactor 40A) into second polymerization reactor 40B. In embodiments, a pump P2 may be configured to circulate the contents of second polymerization reactor 40B (e.g., a slurry loop polymerization reactor).

A line 45A may fluidly connect second polymerization reactor 40B with separation vessel 50A, which may be a flash unit or chamber. A throttling valve 44 may be positioned on line 45A and operable to control the rate of flow out of second polymerization reactor 40B. In embodiments, throttling valve 44 may be a plug valve or ball valve, as described for example in U.S. Pat. No. 7,109,290, the disclosure of which is hereby incorporated herein by reference in its entirety for all purposes not contrary to this disclosure, or a continuous takeoff valve, as described for example in U.S. Pat. No. 8,921,498, the disclosure of which is hereby incorporated herein by reference in its entirety for all purposes not contrary to this disclosure. A flashline heater 46, as described for example in U.S. Pat. No. 8,921,498, may be positioned on line 45A.

Flash chamber 50A receives polymer from second polymerization reactor 40B via line 45A, which may be a high pressure line. Flash chamber 50A generally removes diluent, solvent, other volatiles, or a combination thereof from the polymer fluff/solids. The volatiles exit the top of the flash chamber 50A via gas outlet line 52A, and may be recycled, in embodiments, for reuse in polymerization reactor 40A, 40B, or both. Depending on the type of polymerization reactor involved, and process design, the flash chamber 50A may also be described as a high pressure flash chamber, primary degasser, or powder separator.

In an embodiment, polymer (also referred to as "polymer fluff" or "polymer solids") is transferred from second polymerization reactor 40B through line 45A to flash chamber 50A via a first pressure differential between the operating pressures of the second polymerization reactor 40B and the flash chamber 50A, as described in U.S. Pat. No. 7,109,289. The operating pressure of the flash chamber 50A may affect the transport of polymer between flash chamber 50A and purge column 50A', as described in U.S. Pat. No. 7,109,289. In an embodiment, flash chamber 50A is operated at a pressure of from about 50 psig (0.34 MPa) to about 500 psig (3.4 MPa); alternatively, from about 130 psig (0.9 MPa) to about 190 psig (1.3 MPa).

As noted hereinabove, flash chamber 50A is operable to separate volatiles remaining with the polymer solids from second polymerization reactor 40B from the solids. Recovered volatiles may be directed from the top of the flash chamber 50A and gas outlet line 52A to recycle. Valve 10A may be fluidly connected with flash chamber 50A via flash chamber outlet line 53A, and may be operable to control solids flow from flash chamber 50A. Valve 10A may be, in embodiments, a rotary feeder comprising cleaning nozzles according to this disclosure. A line 54A (which may be a low pressure line, in embodiments) may be configured to carry polymer solids from flash chamber 50A to a purge column 50A'.

Purge column 50A' receives polymer from flash chamber 50A via line 54A. In an embodiment, purge column 50A' is operated at a pressure of from about 150 psig (1 MPa) to about −5 psig (−0.03 MPa); alternatively, from about 25 psig (0.17 MPa) to about 0 psig (0 MPa); alternatively from about 10 psig (0.07 MPa) to about 2 psig (0.01 MPa). Purge column 50A' generally employs a stripping or purge gas, such as nitrogen, fed near the bottom of purge column 50A'. For example, line 51A' may be configured to supply purge gas (e.g., nitrogen) to purge column 50A'. Within purge column 50A', purge gas supplied by line 51A' further removes volatiles (e.g., diluent isobutane) from the polymer solids in purge column 50A'. Line 52A' is fluidly connected with purge column 50A', and configured to convey the supplied purge gas and displaced volatiles from the top of purge column 50A'. The purge gas may be purified of volatiles and recycled to the purge column via a purge gas—solvent/diluent recovery unit, such as, for example, an isobutane nitrogen recovery unit (IBNU). The purged volatiles (e.g., isobutane) exit purge column 50A' along with the purge or carrier gas via line 52A'. Apparatus may be included in system 100C to remove volatiles from the purge gas (e.g., nitrogen) via, for example, compression, condensation, absorption, adsorption, a membrane, combinations thereof or other separation means. The system may be configured such that the recovered purge gas may be recycled to purge column 50A' via line 51A', to further purge residual volatiles from polymer solids.

In an embodiment, as described in U.S. Pat. No. 7,109,290, purge column 50A' combines the functions of a purge column and extruder feed tank: recovering volatiles, providing surge volume capacity, and feeding polymer to an extruder. Thus, in embodiments, purge column 50A' comprises the functions of a disengaging vessel, a purge column, and an extruder feed tank. In embodiments, purge column 50A' is separate from an extruder feed tank (such as extruder feed tank 50C in the embodiment of FIG. 5), and gravity may be employed to move polymer from purge column 50A' to a downstream vessel, such as an extruder feed tank.

In embodiments, purge column 50A' is fluidly connected via purge column outlet line 53A' with rotary feeder 10A', which may be a rotary feeder comprising cleaning nozzles according to this disclosure. Rotary feeder 10A' may be fluidly connected via rotary feeder outlet line 54A' with a downstream vessel into which polymer fluff from purge chamber 50A' is introduced via rotary feeder 10A'. The downstream vessel may be a fluff silo or storage tank, an extruder feed tank, an extruder hopper, or an extruder. For example, as in the embodiment of FIG. 5, rotary feeder outlet line 54A' and fluff silo inlet line 45B may fluidly connect rotary feeder 10A' with fluff silo 50B, while rotary feeder outlet line 54A' and extruder feed tank inlet line 45C may fluidly connect rotary feeder 10A' with extruder feed tank 50C. Alternatively or additionally, a rotary feeder 10B according to this disclosure may fluidly connect fluff silo or storage tank 50B outlet line 53B with extruder feed tank 50C via extruder feed tank inlet line 45C, whereby polymer fluff may be introduced from fluff silo or storage tank 50B into extruder feed tank 50C. Alternatively or additionally, a rotary feeder 10C according to this disclosure may fluidly connect extruder feed tank 50C via extruder feed tank outlet line 53C with extruder hopper 50D (or directly with extruder 50D', not shown in the embodiment of FIG. 5) via extruder hopper inlet line 54C, whereby polymer fluff may be introduced from extruder feed tank 50C into extruder feed hopper 50D (or directly into extruder 50D', not shown in the embodiment of FIG. 5). In embodiments, an extruder hopper outlet line 54C' may fluidly connect extruder hopper 50D with extruder 50D', and an extruder or product outlet line 55 may be configured for the removal of polymer product (e.g., polymer pellets) from extruder 50D'.

As noted hereinabove with reference to the embodiment of FIG. 3, various components (e.g., one or more additives) may be combined with the polymer fluff in one or more of extruder feed tank 50C, extruder hopper 50D, and extruder 50D', and subsequently extruded therewith. For example, in the embodiment of FIG. 5, a line 56 is configured for the introduction of various components (e.g., additives such as stabilizers) into extruder hopper 50D, whereby said components can subsequently be extruded with the polymer fluff. As noted above, such additives are known to those of skill in the art, and will not be expounded upon here.

In embodiments, first and second polymerization reactors 40A and 40B are loop slurry reactors comprising ethylene monomer, 1-hexene comonomer, and isobutane as solvent. The slurry loop reactors may operate at a pressure of about 650 psig (4.5 MPa), the flash chamber 50A may operate at a pressure of about 135 psig (0.9 MPa), and the purge column 50A' may operate at a pressure of from greater than about 0 psig (0 MPa) to about 5 psig (0.03 MPa).

In embodiments, the gas in line 52, 52A, 52A', 52A" may comprise one or more of hydrogen, nitrogen, methane, ethylene, ethane, propylene, propane, butane, isobutane, pentane, hexane, hexene-1, and heavier hydrocarbons. In embodiments, ethylene may be present in a range of from about 0.1% to about 15%, alternatively, from about 1.5% to about 5%, alternatively, about 2% to about 4% by total weight of the line. Ethane may be present in a range of from about 0.001% to about 4%, alternatively, from about 0.2% to about 0.5% by total weight of the line. Isobutane may be present in a range from about 80% to about 98%, alternatively, from about 92% to about 96%, alternatively, about 95% by total weight of the line.

Although described as rotary feeders comprising cleaning nozzles according to this disclosure, it is to be understood that a system of this disclosure may comprise one or more rotary feeders comprising cleaning nozzles, and other conventional rotary feeders (i.e., rotary feeders not comprising cleaning nozzles as described herein). For example, a system such as shown in the embodiment of FIG. 3, may comprise one or more rotary feeders as described herein; that is, one or more of rotary feeders 10A, 10B, and 10C may be a rotary feeder comprising cleaning nozzles as described herein, while conventional rotary feeders that do not contain cleaning nozzles as described herein, or other transfer apparatus (e.g., gravity, pressure differential, valves, etc.), may be utilized for the remaining transfer(s). Similarly, a system such as shown in the embodiment of FIG. 4, may comprise one or more rotary feeders as described herein; that is, one or more of rotary feeders 10A, 10A', and 10A" may be a rotary feeder comprising cleaning nozzles as described herein, while conventional rotary feeders that do not contain cleaning nozzles as described herein, or other transfer apparatus, may be utilized for the remaining transfer(s). Similarly, a system such as shown in the embodiment of FIG. 5, may comprise one or more rotary feeders as described herein; that is, one or more of rotary feeders 10A, 10A', 10B, and 10C may be a rotary feeder comprising cleaning nozzles as described herein, while conventional rotary feeders that do not contain cleaning nozzles as described herein, or other transfer apparatus, may be utilized for the remaining transfer(s).

Also disclosed herein is a method of transferring material utilizing a rotary feeder comprising cleaning nozzles according to this disclosure. The herein-disclosed method comprises introducing a polymer fluff into a rotary valve as described herein, and injecting gas into the rotary feeder via the number of injection nozzles. In embodiments, the herein-disclosed rotary feeder comprises a stationary, cylindrical housing having disposed therein a number of injection nozzles, and within which rotate a plurality of vanes about a central axis, wherein the housing extends a width along the central axis, wherein each of the vanes has a length along the central axis, and wherein the injection nozzles are positioned across the width of the housing, such that a spray pattern of a gas injected via the number of injection nozzles spans substantially the entire length of the vanes.

The method may comprise injecting a gas substantially continuously during operation of the rotary feeder, or via pulsed injection. The injection nozzles may be pulsed simultaneously, sequentially, or a combination thereof. For example, multiple injection nozzles may be pulsed together, in sequence with others of the injection nozzles. By way of non-limiting example, injection nozzles 1 and 3 of the embodiment of FIG. 1B may be pulsed together in series with injection nozzles 2 and 4, which may be also be pulsed together, or the like. In embodiments, the injection nozzles are pulsed in series. In embodiments, the injection nozzles are pulsed one at a time in series. For example, injection nozzles 1 to 4 of the embodiment of FIG. 1B may be pulsed in the order 1, 2, 3, 4. Alternatively, they are pulsed out of order, e.g., in the order 1, 3, 2, 4 or 1, 4, 2, 3, or the like. The injection nozzles may be pulsed in series once every 3 to 30, 3 to 10, or 3 to 5 seconds, or continuously. For example, injection nozzles 1 to 4 of the embodiment of FIG. 1B may be pulsed in series (e.g., injection nozzle 1, then 2, then 3, then 4) for a duration of from about 3 to about 5 seconds per nozzle, and the entire series of nozzles may be pulsed once every 3 to 30, 3 to 10, or 3 to 5 seconds. In embodiments, injection nozzles 36 cycle through pulsing for a pulsing time period (e.g., 1, 2, 3 minutes) every so often (e.g., every 3, 5, or 7 minutes), with each nozzle opening for about 3-5 seconds at a time during the pulsing time period.

Via utilization of a rotary feeder comprising cleaning nozzles according to this disclosure, a rate of polymer buildup on the vanes of the rotary feeder may be reduced relative to a rate of polymer buildup on vanes of a rotary feeder not comprising said injection nozzles. Although dependent on the application, and without wishing to be limited, in embodiments, the rate of polymer buildup is decreased by at least 10, 15, or 20%.

During operation, the rotation speed of a rotary feeder is generally increased if there is buildup of material on the vanes thereof, in order to maintain a desired production rate. However, when the volume transferred via the rotary feeder is insufficient to provide sufficient material to meet a desired production rate even at maximum rotation speed, production may be interrupted so that the rotary feeder can be cleaned (e.g., mechanically cleaned via scraping, abrasive blasting, etc.). Desirably, utilization of a rotary feeder comprising cleaning nozzles according to this disclosure enables a longer time on stream before cleaning is deemed necessary. In embodiments, an amount of free or transport volume (i.e., volume not occupied by undesired polymer buildup) present in wedge volumes WV necessary to provide a desired polymer outlet rate can be maintained for an increased time of operation relative to a rotary feeder not comprising injection nozzles 36. The increased time may, in embodiments, be at least an additional 1, 5, 10, 20, or 30 days, or 1, 2, or 3 months.

A rotary feeder comprising specialized injection nozzles, as described herein, may enable injection of gas into an interior space of the rotary feeder, whereby buildup of material, such as polymer fluff, on interior surfaces, including vanes of the rotary feeder, can be decreased. In this manner, such a rotary feeder may more effectively maintain efficient transfer of material, such as polymer, from the feeder relative to a rotary feeder absent such injection nozzles. Although tubing could be utilized for the introduction of gas into the rotary feeder, in embodiments, incorporation of specialized nozzles, which may provide a desired (e.g., fan type) spray pattern, may more effectively clean the interior surfaces (e.g., the rotating vanes) of the rotary feeder.

Additional Disclosure

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

The following are nonlimiting, specific embodiments in accordance with the present disclosure:

A: A rotary feeder comprising: a stationary, cylindrical housing having disposed therein a number of injection nozzles, and within which rotate a plurality of vanes about a central axis, wherein the housing extends a width along the central axis, wherein each of the vanes has a length along the central axis, and wherein the injection nozzles are positioned across the width of the housing, such that a spray pattern of a gas injected via the number of injection nozzles spans substantially the entire length of the vanes.

B: A system comprising: one or more polymerization reactors configured to produce a product polymer; a vessel configured to receive the polymer product produced in the one or more polymerization reactors, wherein the vessel comprises a flash unit, a purge column, a polymer product storage silo, an extruder, a primary degasser, a secondary degasser, an extruder feed tank, or a combination thereof; and a rotary feeder comprising a stationary, cylindrical housing having disposed therein a number of injection nozzles, and within which rotate a plurality of vanes about a central axis, wherein the housing defines an inlet and an outlet, and extends a width along the central axis, wherein each of the vanes has a length along the central axis, and wherein the injection nozzles are positioned across the width of the housing, such that a spray pattern of a gas injected via the number of injection nozzles spans substantially the entire length of the vanes, wherein the rotary feeder is downstream of the vessel and fluidly connected therewith, via the inlet of the rotary feeder, whereby product polymer is introduced thereto.

C: A method comprising: introducing a polymer fluff into a rotary valve comprising: a stationary, cylindrical housing having disposed therein a number of injection nozzles, and within which rotate a plurality of vanes about a central axis, wherein the housing extends a width along the central axis, wherein each of the vanes has a length along the central axis, and wherein the injection nozzles are positioned across the width of the housing, such that a spray pattern of a gas injected via the number of injection nozzles spans substantially the entire length of the vanes; and injecting gas into the rotary feeder via the number of injection nozzles.

D: A rotary feeder comprising: a stationary, cylindrical housing having disposed therein a number of injection nozzles, and within which rotate a plurality of vanes about a central axis, wherein pairs of adjacent vanes of the plurality of vanes define wedge volumes, wherein the housing extends a width along the central axis, wherein each of the vanes has a length along the central axis, and wherein the injection nozzles are positioned across the width of the housing, such that a spray pattern of a gas injected via the number of injection nozzles spans substantially the entire length of the vanes.

E: A rotary feeder comprising: a stationary, cylindrical housing having disposed therein a number of injection nozzles, and within which rotate a plurality of vanes about a central axis, wherein the housing extends a width along the central axis, wherein each of the vanes has a length along the central axis, wherein the injection nozzles are positioned across the width of the housing, such that a spray pattern of a gas injected via the number of injection nozzles spans substantially the entire length of the vanes, and wherein each of the number of injection nozzles is located at a position along a circumference of the housing that is in the range of from about 50° to about 170° from an inlet of the rotary feeder, along a direction of rotation of the plurality of vanes.

F: A rotary feeder comprising: a stationary, cylindrical housing having disposed therein a number of injection nozzles, and within which rotate a plurality of vanes about a central axis, wherein the housing extends a width along the central axis from end walls thereof, wherein each of the vanes extends a length along the central axis, wherein the length each of the plurality of vanes extends along the central axis is slightly less than the width of the housing along the central axis, such that the each of the plurality of vanes extends almost to the end walls of the housing and can rotate freely within the housing, and wherein the injection nozzles are positioned across the width of the housing, such that a spray pattern of a gas injected via the number of injection nozzles spans substantially the entire length of the vanes.

G: A rotary feeder comprising: a stationary, cylindrical housing having disposed therein a number of injection nozzles, and within which rotate a plurality of vanes about a central axis, wherein the stationary, cylindrical housing defines an inlet and an outlet, wherein the inlet is positioned at a top of the housing, and the outlet is positioned at a bottom of the housing, wherein the housing extends a width along the central axis, wherein each of the vanes has a length along the central axis, and wherein the injection nozzles are positioned across the width of the housing, such that a spray pattern of a gas injected via the number of injection nozzles spans substantially the entire length of the vanes.

Each of embodiments A, B, C, D, E, F, and G may have one or more of the following additional elements. Element 1: wherein the length of each vane of the plurality of vanes is in the range of from about 12 inches (30.5 cm) to about 20 inches (50.8 cm). Element 2: wherein the stationary, cylindrical housing further defines an inlet and an outlet, optionally wherein the inlet is positioned at a top of the housing, and optionally wherein each of the number of injection nozzles is located at a position along a circumference of the housing that is in the range of from about 90° to about 160°, or from about 50° to about 170°, from the inlet, along a direction of rotation of the plurality of vanes. Element 3: wherein the number of injection nozzles are located in a line across the width of the housing. Element 4: comprising eight vanes. Element 5: wherein the number of injection nozzles are positioned substantially equidistantly apart across the width of the housing. Element 6: wherein a center-to-center distance between adjacent injection nozzles is equal to the width of the housing divided by the number of injection nozzles. Element 7: wherein a center-to center-distance between adjacent injection nozzles is in the range of from about 2 inches (50.8 mm) to about 4 inches (10.16 cm). Element 8: wherein a first injection nozzle and a last injection nozzle across the width of the housing are located a distance along the central axis from an end of the housing closest thereto that is about equal to the width of the housing divided by two times the number of injection nozzles. Element 9: wherein the number of injection nozzles is in the range of from about 4 to about 5. Element 10: wherein each of the number of injection nozzles is configured to provide a spray pattern selected from fan patterns, air-knife patterns, or combinations thereof. Element 11: wherein each of the number of injection nozzles is configured to provide a fan spray pattern. Element 12: wherein a spray pattern provided by each of the number of injection nozzles comprises a spray angle in the range of from about 15° to about 120°. Element 13: wherein each of the number of spray nozzles is fluidly connected with a gas source via a gas feed line. Element 14: wherein each of the number of spray nozzles is fluidly connected with a gas source via a gas feed line, optionally having an inside diameter in the range of from about ¼ inch (6.4 mm) to about ½ inch (12.7 mm). Element 15: wherein each of the number of spray nozzles is fluidly connected with a gas source via a gas feed line, and wherein the gas source provides gas at a pressure in the range of from about 40 psi (0.28 MPa) to about 60 psi (0.41 MPa). Element 16: wherein the injection nozzles are positioned across the width of the housing such that the spray pattern of each of the number of injection nozzles overlaps the spray pattern of at least one adjacent nozzle. Element 17: wherein a spray pattern of each of the number of injection nozzles overlaps, at the vanes, a spray pattern of at least one adjacent nozzle by at least 10%. Element 18: wherein each of the number of injection nozzles is a one-piece construction. Element 19: wherein each of the number of injection nozzles is made of brass, 303 stainless steel, 316 stainless steel, polyvinyl chloride (PVC), polytetrafluoroethylene (PTFE), or a combination thereof. Element 20: further comprising injecting gas substantially continuously during operation of the rotary feeder, or via pulsed injection. Element 21: further comprising pulsing the number of injection nozzles simultaneously, sequentially, or a combination thereof. Element 22: wherein the injection nozzles are pulsed in series. Element 23: wherein the injection nozzles are pulsed in series for about one minute every five minutes, with each nozzle pulsed for 2 to 5 seconds; or continuously. Element 24: wherein a rate of polymer buildup on the vanes of the rotary feeder is reduced relative to a rate of polymer buildup on vanes of a rotary feeder not comprising said injection nozzles. Element 25: wherein the rate of polymer buildup is decreased by at least 10%. Element 26: wherein an amount of polymer fill of wedge volumes defined by the plurality of vanes to provide a desired polymer outlet rate can be maintained for an increased time of operation relative to a rotary feeder not comprising said injection nozzles. Element 27: wherein an increased time comprises at least an additional 24 hours. Element 28: wherein the number of injection nozzles are positioned such that the wedge volumes defined by the pairs of adjacent vanes are substantially full when they rotate past the location of the number of injection nozzles within the housing. Element 29: wherein the inlet is positioned at a top of the housing, and/or wherein the outlet is positioned at a bottom of the housing. Element 30: wherein the length of each of the plurality of vanes is slightly less than the width of the housing along the central axis, such that the each of the plurality of vanes extends almost to the end walls of the housing and can rotate freely within the housing. Element 31: wherein the length of each of the plurality of vanes is less than 1.0, 0.5, 0.25, 0.15, 0.1 or 0.05 inch (25.4, 12.7, 6.35, 3.81, 2.54, or 1.27 mm)) less than the width of the housing. Element 32: wherein pairs of adjacent vanes of the plurality of vanes define wedge volumes.

While preferred embodiments of the invention have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference, to the extent that they provide exemplary, procedural or other details supplementary to those set forth herein.

What is claimed is:

1. A rotary feeder comprising:
a stationary, cylindrical housing having disposed therein a number of injection nozzles, and within which rotate a plurality of vanes about a central axis, wherein pairs of adjacent vanes of the plurality of vanes define wedge volumes, wherein the housing extends a width along the central axis, wherein each of the vanes has a length along the central axis, and wherein the injection nozzles are positioned across the width of the housing, such that a spray pattern of a gas injected via the number of injection nozzles spans substantially the entire length of the vanes, wherein each of the number of injection nozzles is fluidly connected with a gas source via a gas feed line.

2. The rotary feeder of claim 1, wherein the number of injection nozzles are positioned such that the wedge volumes defined by the pairs of adjacent vanes are substantially full when they rotate past the location of the number of injection nozzles within the housing.

3. The rotary feeder of claim 2, wherein each of the number of injection nozzles is located at a position along a circumference of the housing that is in the range of from about 50° to about 170° from an inlet of the rotary feeder, along the direction of rotation of the plurality of vanes.

4. The rotary feeder of claim 1, wherein the stationary, cylindrical housing defines an inlet and an outlet of the rotary feeder, wherein the inlet is positioned at a top of the housing, and the outlet is positioned at a bottom of the housing.

5. The rotary feeder of claim 1, wherein the length of each of the plurality of vanes is slightly less than the width of the housing along the central axis, such that the each of the plurality of vanes extends almost to the end walls of the housing and can rotate freely within the housing.

6. The rotary feeder of claim 1, wherein the number of injection nozzles are located in a line across the width of the housing.

7. The rotary feeder of claim 6, wherein the number of injection nozzles are positioned substantially equidistantly apart across the width of the housing.

8. The rotary feeder of claim 7, wherein a center-to-center distance between adjacent injection nozzles is equal to the width of the housing divided by the number of injection nozzles.

9. The rotary feeder of claim 1, wherein a first injection nozzle and a last injection nozzle across the width of the housing are located a distance along the central axis from an end of the housing closest thereto that is about equal to the width of the housing divided by two times the number of injection nozzles.

10. The rotary feeder of claim 1, wherein each of the number of injection nozzles is configured to provide a spray pattern selected from fan patterns, air-knife patterns, or combinations thereof.

11. The rotary feeder of claim 10, wherein each of the number of injection nozzles is configured to provide a fan spray pattern, wherein a spray pattern provided by each of the number of injection nozzles comprises a spray angle in the range of from about 15° to about 120°.

12. The rotary feeder of claim 1, wherein the number of injection nozzles are positioned across the width of the housing such that the spray pattern of each of the number of injection nozzles overlaps the spray pattern of at least one adjacent nozzle.

13. The rotary feeder of claim 1, wherein, of the number of injection nozzles, a first injection nozzle and a last injection nozzle across the width of the housing are located a distance along the central axis from an end of the housing closest thereto that is about equal to the width of the housing divided by two times the number of injection nozzles.

14. A rotary feeder comprising:
a stationary, cylindrical housing having disposed therein a number of injection nozzles, and within which rotate a plurality of vanes about a central axis, wherein the housing extends a width along the central axis, wherein each of the vanes has a length along the central axis, wherein the injection nozzles are positioned across the width of the housing, such that a spray pattern of a gas injected via the number of injection nozzles spans substantially the entire length of the vanes, wherein each of the number of injection nozzles is located at a position along a circumference of the housing that is in the range of from about 50° to about 170° from an inlet of the rotary feeder, along a direction of rotation of the plurality of vanes, and wherein each of the number of injection nozzles is fluidly connected with a gas source via a gas feed line.

15. The rotary feeder of claim 14, wherein each of the number of injection nozzles is located at a position along a circumference of the housing that is in the range of from about 90° to about 160° from the inlet, along the direction of rotation of the plurality of vanes.

16. The rotary feeder of claim 14, wherein the stationary, cylindrical housing defines the inlet and an outlet, wherein the inlet is positioned at a top of the housing, and the outlet is positioned at a bottom of the housing.

17. The rotary feeder 14, wherein the length of each of the plurality of vanes is slightly less than the width of the housing along the central axis, such that the each of the plurality of vanes extends almost to the end walls of the housing and can rotate freely within the housing.

18. The rotary feeder of claim 14, wherein pairs of adjacent vanes of the plurality of vanes define wedge volumes.

19. A rotary feeder comprising:
a stationary, cylindrical housing having disposed therein a number of injection nozzles, and within which rotate a plurality of vanes about a central axis, wherein the housing extends a width along the central axis from end walls thereof, wherein each of the vanes extends a length along the central axis, wherein the length each of the plurality of vanes extends along the central axis is slightly less than the width of the housing along the central axis, such that the each of the plurality of vanes extends almost to the end walls of the housing and can rotate freely within the housing, wherein the injection nozzles are positioned across the width of the housing, such that a spray pattern of a gas injected via the number of injection nozzles spans substantially the entire length of the vanes, and wherein each of the number of injection nozzles is fluidly connected with a gas source via a gas feed line.

20. The rotary feeder of claim 19, wherein the length of each of the plurality of vanes is less than 1.0 inch (25.4 mm) less than the width of the housing.

* * * * *